(12) United States Patent
Lim et al.

(10) Patent No.: US 8,693,770 B2
(45) Date of Patent: Apr. 8, 2014

(54) APPARATUS AND METHOD FOR PROCESSING IMAGES

(75) Inventors: Jae-Guyn Lim, Seongnam-si (KR); Won-Hee Choe, Hwaseong-si (KR); Byung-Kwan Park, Seoul (KR); Young-Jin Yoo, Hwaseong-si (KR); Seong-Deok Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 179 days.

(21) Appl. No.: 13/165,419

(22) Filed: Jun. 21, 2011

(65) Prior Publication Data
US 2012/0020555 A1 Jan. 26, 2012

(30) Foreign Application Priority Data

Jul. 21, 2010 (KR) .................. 10-2010-0070568

(51) Int. Cl.
*G06K 9/00* (2006.01)
(52) U.S. Cl.
USPC .......................................... 382/165
(58) Field of Classification Search
None
See application file for complete search history.

(56) References Cited

U.S. PATENT DOCUMENTS

| | | | |
|---|---|---|---|
| 6,738,169 B1 * | 5/2004 | Nakase | 358/539 |
| 6,759,646 B1 | 7/2004 | Acharya et al. | |
| 2006/0050335 A1 * | 3/2006 | Dorrell et al. | 358/516 |
| 2007/0024934 A1 | 2/2007 | Andams, Jr. et al. | |
| 2009/0147099 A1 * | 6/2009 | Kim et al. | 348/223.1 |
| 2009/0161950 A1 * | 6/2009 | Dana et al. | 382/165 |
| 2009/0295950 A1 | 12/2009 | Abe | |
| 2010/0002948 A1 * | 1/2010 | Gangwal et al. | 382/254 |
| 2010/0097495 A1 * | 4/2010 | Choe et al. | 348/235 |
| 2010/0315541 A1 * | 12/2010 | Egawa | 348/294 |

FOREIGN PATENT DOCUMENTS

| | | |
|---|---|---|
| JP | 2004-304706 | 10/2004 |
| JP | 2005-136766 | 5/2005 |
| JP | 2006-340100 | 12/2006 |
| JP | 2009-290607 | 12/2009 |

* cited by examiner

*Primary Examiner* — Stephen R Koziol
*Assistant Examiner* — Delomia Gilliard
(74) *Attorney, Agent, or Firm* — NSIP Law

(57) ABSTRACT

Provided are an image processing apparatus and method for restoring a high resolution of an image based on acquired image data using color information. The image processing apparatus selects at least one pixel from among pixels corresponding to narrow-band color information of image data, and estimates wide-band color information of the selected pixel.

20 Claims, 12 Drawing Sheets

FIG. 4C

|     | 410 |     |     |     | 411 |     |     |     | 412 |     |     |
|-----|-----|-----|-----|-----|-----|-----|-----|-----|-----|-----|-----|
| $G_5$ | $R_5$ | $G_6$ | $R_6$ | $G_1$ | $R_1$ | $G_2$ | $R_2$ | $G_9$ | $R_9$ | $G_{10}$ | $R_{10}$ |
| $B_5$ | $W_5$ | $B_6$ | $W_6$ | $B_1$ | $W_1$ | $B_2$ | $W_2$ | $B_9$ | $W_9$ | $B_{10}$ | $W_{10}$ |
| $G_7$ | $R_7$ | $G_8$ | $R_8$ | $G_3$ | $R_3$ | $G_4$ | $R_4$ | $G_{11}$ | $R_{11}$ | $G_{12}$ | $R_{12}$ |
| $B_7$ | $W_7$ | $B_8$ | $W_8$ | $B_3$ | $W_3$ | $B_4$ | $W_4$ | $B_{11}$ | $W_{11}$ | $B_{12}$ | $W_{12}$ |

FIG. 4F

| | | | | 410 | | | | 411 | | | | 412 | | | |
|---|---|---|---|---|---|---|---|---|---|---|---|---|---|---|---|

| $W_{30}$ | $W_{30}$ | $W_{31}$ | $W_{31}$ | $W_{21}$ | $W_{25}$ | $W_{22}$ | $W_{26}$ | $W_{35}$ | $W_{35}$ | $W_{36}$ | $W_{36}$ |
|---|---|---|---|---|---|---|---|---|---|---|---|
| $W_{30}$ | $W_{5}$ | $W_{31}$ | $W_{6}$ | $W_{25}$ | $W_{1}$ | $W_{26}$ | $W_{2}$ | $W_{35}$ | $W_{9}$ | $W_{36}$ | $W_{10}$ |
| $W_{32}$ | $W_{32}$ | $W_{33}$ | $W_{33}$ | $W_{23}$ | $W_{27}$ | $W_{24}$ | $W_{28}$ | $W_{37}$ | $W_{37}$ | $W_{38}$ | $W_{38}$ |
| $W_{32}$ | $W_{7}$ | $W_{33}$ | $W_{8}$ | $W_{27}$ | $W_{3}$ | $W_{28}$ | $W_{4}$ | $W_{37}$ | $W_{11}$ | $W_{38}$ | $W_{12}$ |

FIG. 4I

| | 461 | 462 | | | | | | | | | | |
|---|---|---|---|---|---|---|---|---|---|---|---|---|
| | b | b | b | b | b | b | b | b | b | b | b | b |
| 463 | B | b | B | b | B | b | B | b | B | b | B | b |
| 460 | | | | | | | | | | | | |
| | b | b | b | b | b | b | b | b | b | b | b | b |
| | B | b | B | b | B | b | B | b | B | b | B | b |

US 8,693,770 B2

APPARATUS AND METHOD FOR PROCESSING IMAGES

CROSS-REFERENCE TO RELATED APPLICATION(S)

This application claims the benefit under 35 U.S.C. §119 (a) of a Korean Patent Application No. 10-2010-0070568, filed on Jul. 21, 2010, in the Korean Intellectual Property Office, the entire disclosure of which is incorporated herein by reference for all purposes.

BACKGROUND

1. Field

The following description relates to an image processing apparatus and method for restoring a high resolution of an image using color information that is included in acquired image data.

2. Description of the Related Art

Existing image processing apparatuses have difficulty in acquiring high-quality images in a various environments such as a low-light environment. In order to acquire high-quality images in a particular environment such as an environment that has low-light conditions, an image sensor capable of absorbing a wide wavelength range of light is used. Absorbing a wide wavelength range of light to create images typically results in an image with a low resolution.

An existing Bayer pattern (2×2) may maintain at least ½ resolution because it has two Green channels. However, because new patterns including only one Green channel are being developed, it is inevitable that a resolution will be reduced to ¼ or less.

For these reasons, studies into a technology that can restore high-quality, high-resolution images while absorbing a wide wavelength range of light are being researched.

SUMMARY

In one general aspect, there is provided an image processing apparatus including a selector configured to select at least one pixel from among pixels that correspond to narrow-band color information of image data that includes narrow-band color information and wide-band color information, and an estimator configured to estimate wide-band color information of the selected pixel, based on narrow-band color information of the selected pixel, narrow-band color information of pixels that are adjacent to the selected pixel, and correlation values between the narrow-band color information and the wide-band color information.

The image processing apparatus may further comprise a region classifying unit configured to classify the image data into a homogeneity region and a non-homogeneity region using a Homogeneity theorem.

The selector may be configured to select at least one pixel from among pixels that correspond to the narrow-band color information in the non-homogeneity region.

The estimator may be further configured to estimate wide-band color information of a pixel that is not selected by the selector, based on the wide-band color information of the image data and the wide-band color information estimated by the estimator.

The estimator may be configured to estimate wide-band color information of pixels that correspond to the narrow-band color information in the homogeneity region, based on the wide-band color information of the image data in the homogeneity region.

The narrow-band color information of pixels that are adjacent to the selected pixel may be narrow-band color information of four pixels, and the four pixels may include the pixels that are directly above, below, to the left, and to the right of the at least one selected pixel.

The image processing apparatus may further comprise a calculator configured to divide the image data into 2×2 blocks that each include three pixels corresponding to the narrow-band color information and one pixel corresponding to the wide-band color information, and to calculate correlation values between the wide-band color information and the narrow-band color information included in each 2×2 block.

The selector may be configured to select at least one pixel from among pixels that correspond to the narrow-band color information, which are located diagonal to pixels corresponding to wide-band color information of the image data.

The image processing apparatus may further comprise an image acquiring unit configured to acquire image data that includes narrow-band color information and wide-band color information that correspond to lights transmitted through a narrow-band color filter and a wide-band color filter, respectively, using photo sensors provided for individual pixels.

The narrow-band color information may be color information about light transmitted through at least one of a Red (R) color filter, a Green (G) color filter, a Blue (B) color filter, a Cyan (C) color filter, a Yellow (Y) color filter, a Magenta (M) color filter and a Black (K) color filter, and the wide-band color information is color information about light transmitted through at least one of a panchromatic filter and a White & Near Infrared (WNIR) filter.

In another aspect, there is provided an image processing method including selecting at least one pixel from among pixels that correspond to narrow-band color information of image data that includes the narrow-band color information and wide-band color information, and estimating wide-band color information of the selected pixel based on narrow-band color information of the selected pixel, narrow-band color information of pixels that are adjacent to the selected pixels, and correlation values between the narrow-band color information and the wide-band color information.

The image processing method may further comprise classifying the image data into a homogeneity region and a non-homogeneity region using a Homogeneity theorem.

The selecting of the at least one pixel may comprise selecting at least one pixel from among pixels that correspond to the narrow-band color information in the non-homogeneity region.

The estimating of the wide-band color information may further comprise estimating wide-band color information of a pixel that is not selected, based on the wide-band color information of the image data and the estimated wide-band color information.

The estimating of the wide-band color information may comprise estimating wide-band color information of pixels that correspond to narrow-band color information in the homogeneity region, based on the wide-band color information of the image data in the homogeneity region.

The narrow-band color information of the pixels adjacent to the selected pixel may be narrow-band color information of four pixels, and the four pixels may include the pixels that are directly above, below, to the left, and to the right of the at least one selected pixel.

The image processing method may further comprise dividing the image data into 2×2 blocks that each include three pixels corresponding to the narrow-band color information and one pixel corresponding to the wide-band color information, and calculating correlation values between the wide-band color information and the narrow-band color information included in each 2×2 block.

The selecting of the at least one pixel may comprise selecting at least one pixel from among pixels that correspond to the narrow-band color information, which are located diagonal to pixels corresponding to the wide-band color information of the image data.

The image processing method may further comprise acquiring image data that includes narrow-band color information and wide-band color information that corresponds to lights that are transmitted through a narrow-band color filter and a wide-band color filter, using photo sensors provided for individual pixels.

The narrow-band color information may be color information about light transmitted through at least one of a Red (R) color filter, a Green (G) color filter, a Blue (B) color filter, a Cyan (C) color filter, a Yellow (Y) color filter, a Magenta (M) color filter and a Black (K) color filter, and the wide-band color information is color information about light transmitted through at least one of a panchromatic filter and a White & Near Infrared (WNIR) filter.

Other features and aspects may be apparent from the following detailed description, the drawings, and the claims.

BRIEF DESCRIPTION OF THE DRAWINGS

FIGS. 4A through 4I are diagrams illustrating examples of image processing.

Figure 1:
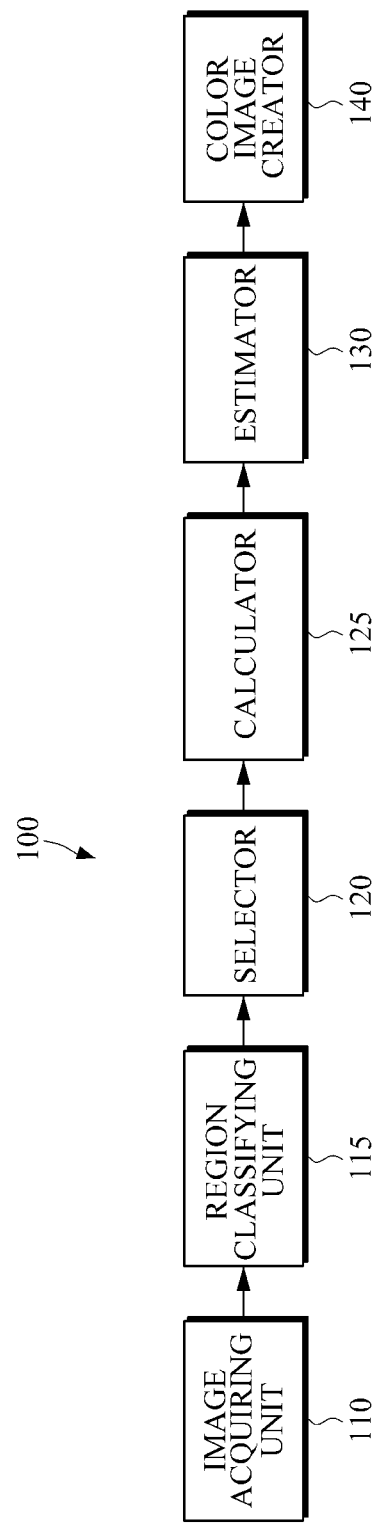
FIG. 1 is a diagram illustrating an example of an image processing apparatus.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

FIG. 1 illustrates an example of an image processing apparatus.

Referring to FIG. 1, the image processing apparatus 100 includes an image acquiring unit 110, a region classifying unit 115, a selector 120, a calculator 125, an estimator 130, and a color image creator 140. The image processing apparatus 100 may be or may be included in a terminal, for example, a computer, a mobile terminal, a smart phone, a laptop computer, a personal digital assistant, a tablet, an MP3 player, and the like.

The image acquiring unit 110 may acquire image data. The image acquiring unit 110 may include various imaging equipment, for example, a lens, a color filter, an image sensor, and the like. The image sensor may recognize light that passes through the lens and color filter and may include a plurality of photo sensors. For example, there may be a photo sensor provided for each pixel. The image sensor may create image data based on the recognized light.

The color filter may include one or more of a Red (R) color filter, a Green (G) color filter, a Blue (B) color filter, a Cyan (C) color filter, a Yellow (Y) color filter, a Magenta (M) color filter, a Black (K) color filter, a panchromatic filter, a White & Near Infrared (WNIR) filter, and the like. For example, the R color filter may allow light to pass that has a wavelength corresponding to a Red color. The image sensor may recognize the light that passes through the color filters to create color information. The color information may contain contrast information of the corresponding color.

For example, when certain color information is 8 bits, the color information may be represented by a number between 0 and 255. In this example, the darkest color may be represented by 0 and the brightest color may be represented by 255. The color information is not limited to this example and may be represented by any desired color information, for example, the color information may be represented by various sizes of bits, such as 12 bits, 16 bits, and the like. The color filter may include a narrow-band filter and a wide-band filter, such as RGBW, CYYW, CMYWNIR, and the like.

The image acquiring unit 110 may acquire narrow-band color information based on light that passes through one or more of a R color filter, G color filter, B color filter, C color filter, Y color filter, M color filter, K color filter, and the like. For example, the narrow-band color information may include color information about light that has a narrow-band wavelength. The narrow-band wavelength may be a wavelength region corresponding to specific colors.

The image acquiring unit 110 may acquire wide-band color information based on light that passes through the panchromatic filter and the WNIR filter. The panchromatic filter may also be referred to as a white filter. For example, the wide-band color information may include color information about light that has a wide-band wavelength. The wide-band wavelength may include a wavelength region corresponding to several colors and a Near Infrared wavelength region. In various aspects, the image acquiring unit 110 may acquire image data including narrow-band color information and wide-band color information, based on light that passes through the color filter.

For example, the image acquiring unit 110 may use photo sensors that are provided for individual pixels to create image data including narrow-color information and wide-band color information corresponding to light that is transmitted through the narrow-band color filters and wide-band color filters. Wavelength distributions with respect to colors are further described with reference to FIG. 2.

The region classifying unit 115 may classify the acquired image data, for example, into a homogeneity region and a non-homogeneity region using a Homogeneity theorem. The homogeneity region includes a region of the image data where changes in image data between pixels are small. The non-homogeneity region includes a region of the image data where changes in image data between pixels are great.

For example, the region classifying unit 115 may calculate horizontal gradient values and vertical gradient values using color information that is included in the image data. Then, the region classifying unit 115 may calculate a standard deviation based on the horizontal and vertical gradient values. The region classifying unit 115 may classify a region that has a standard deviation that is smaller than a reference value into a homogeneity region and may classify a region that has a standard deviation that is greater than the reference value into a non-homogeneity region. In this example, the reference value is a setting value for distinguishing homogeneity regions from non-homogeneity regions.

As another example, the region classifying unit 115 may distinguish homogeneity regions from non-homogeneity regions using a high pass filter and a convolution computation. It should also be appreciated that the region classifying unit 115 may use any other methods to distinguish homogeneity regions from non-homogeneity regions.

As described herein, the image data includes narrow-band color information and wide-band color information. The selector 120 may select at least one pixel including narrow-band color information from the non-homogeneity region of the image data that is acquired by the image acquiring unit 110. For example, the selector 120 may select at least one pixel corresponding to narrow-band color information which is located diagonal to pixels corresponding to wide-band color information of the image data.

The calculator 125 may divide the non-homogeneity region of the image data into blocks, for example, 2×2 blocks that each include three pixels corresponding to narrow-band color information and one pixel corresponding to wide-band color information. The calculator 125 may calculate correlation values between the three pieces of narrow-band color information and one piece of wide-band color information included in each block.

The estimator 130 may estimate wide-band color information of the selected pixel, based on the narrow-band color information of the selected pixel, narrow-band color information of pixels adjacent to the selected pixel, and/or the correlation values between the acquired narrow-band color information and the acquired wide-band color information. For example, the narrow-band color information of pixels that are adjacent to the selected pixel may be narrow-band color information of four pixels that are positioned above, below, left, and right of the selected pixel.

As another example, the estimator 130 may estimate wide-band color information of a pixel corresponding to narrow-band color information in the homogeneity region of the image data, based on the acquired wide-band color information.

The estimator 130 may restore blurred images using an image restoration method. For example, the image restoration method may include a Wiene filter algorithm, a Lucy-Richardson algorithm, a Priori Sparsity algorithm, and the like.

The estimator 130 may estimate wide-band color information of pixels that are not selected by the selector 120 in the non-homogeneity region, based on the wide-band color information that is acquired by the image acquiring unit 110 and the wide-band color information that is estimated by the estimator 130. For example, the estimator 130 may estimate wide-band color information of pixels that are not selected by the selector 120 using an interpolation method, such as Constant Hue-Based interpolation, Edge-Directed interpolation, Median-Based interpolation by freeman. Homogeneity-Directed interpolation by K. Hirakawa and T. W. Parks, and the like. Accordingly, the image processing apparatus 100 may acquire wide-band color information of all pixels corresponding to the image data.

The color image creator 140 may create color image data based on image data including the estimated wide-band color information and the acquired wide-band color information. Image processing and the results of the image processing by individual components illustrated in FIG. 1 are further described with reference to FIGS. 4A through 4I.

The current example corresponds to the case in which the image processing apparatus 100 includes the region classifying unit 115, however, the image processing apparatus 100 may not include a region classifying unit. For example, the selector 120 may select at least one pixel including narrow-band color information from among the image data acquired by the image acquiring unit 110. The selector 120 may select at least one pixel corresponding to narrow-band color information, which is located diagonal to pixels corresponding to wide-band color information of the image data.

The calculator 125 may divide the image data into 2×2 blocks that each include three pixels corresponding to narrow-band color information and one pixel corresponding to wide-band color information. The calculator 125 may calculate correlation values between the three pieces of narrow-band color information and the one piece of wide-band color information included in each block.

Then, the estimator 130 may estimate the wide-band color information of the selected pixel, based on the narrow-band color information of the selected pixel, the narrow-band color information of pixels adjacent to the selected pixel, and/or the correlation values between the acquired narrow-band color information and the acquired wide-band color information. The estimator 130 may also estimate wide-band color information of pixels that are not selected by the selector 120 based on the acquired wide-band color information and the estimated wide-band color information. Accordingly, the image processing apparatus 100 may acquire wide-band color information of all pixels corresponding to the image data. That is, the image processing apparatus 100 may estimate wide-band color information without dividing image data into homogeneity and non-homogeneity regions.

As described in the example of FIG. 1, the image processing apparatus 100 may estimate wide-band color information based only on acquired narrow-band color information. The image processing apparatus 100 may estimate wide-band color information of entire image data using a small amount of acquired wide-band color information. In addition, the image processing apparatus 100 may restore full resolution of an image or near full resolution of the image by restoring image data using estimated wide-band color information.

Figure 2:
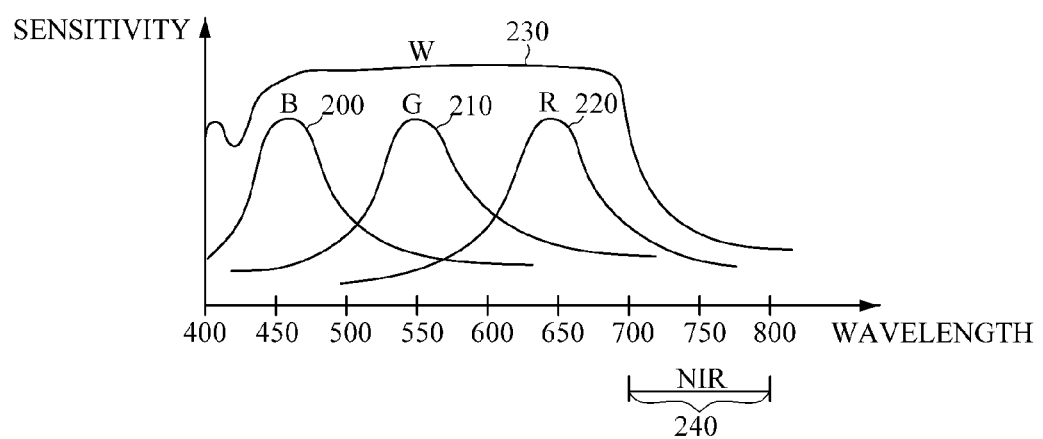
FIG. 2 is a graph illustrating an example of color spectrums that appear according to wavelengths.

FIG. 2 is a graph that illustrates examples of color spectrums that appear according to wavelengths.

In the current example, the unit of wavelength is expressed in nanometers (nm) and the unit of sensitivity depends on a predetermined criteria. The vertical axis of the graph may be expressed as relative magnitudes.

Referring to FIG. 2, the B color 200 shows the greatest sensitivity value at a wavelength of 450 nm and has a wavelength range of approximately 400 nm to 500 nm. The G color 210 shows the greatest sensitivity value at a wavelength of 550 nm and has a wavelength range of approximately 500 nm to 600 nm. The R color 220 shows the greatest sensitivity value at a wavelength of 650 nm and has a wavelength range of approximately 600 nm to 700 nm. The W color 230 has a wavelength range including all of the R, G and B colors 200, 210 and 220. The WNIR extends over all of the W color and NIR regions.

In the example of FIG. 2, the B, G and R colors 200, 210, and 220 are examples of narrow-band colors and the W color and WNIR are examples of wide-band colors.

Figure 3:
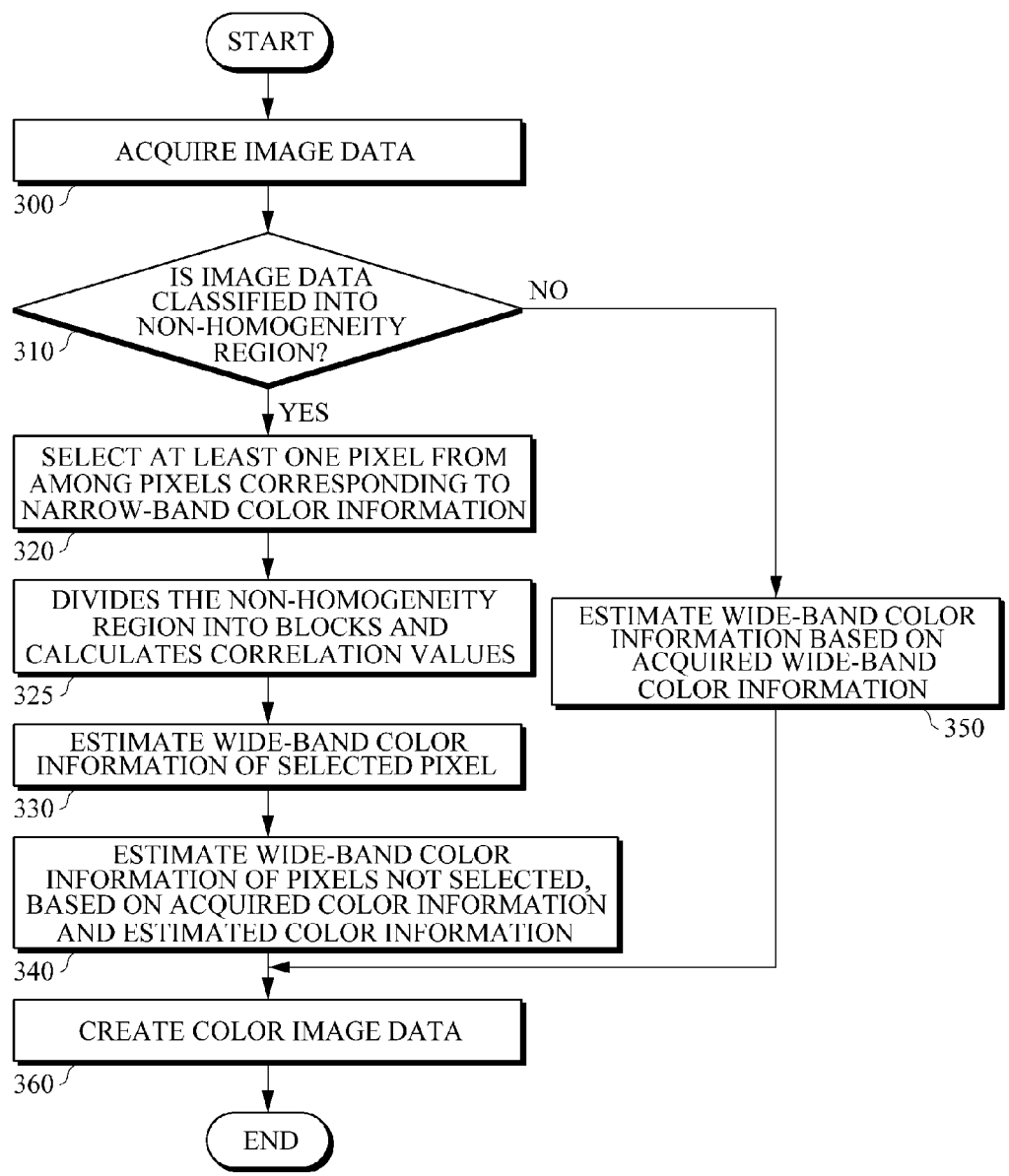
FIG. 3 is a flowchart illustrating an example of an image processing method.

FIG. 3 illustrates an example of an image processing method.

Referring to FIGS. 1 and 3, the image acquiring unit 110 acquires image data including narrow-band color information and wide-band color information (300). Whether the image data is classified into non-homogeneity regions (310). As another example, a region classifying unit 115 may classify the image data into a homogeneity region and a non-homogeneity region using a Homogeneity theorem (310). In response to the image data being classified into a non-homogeneity region, the selector 120 selects at least one pixel including narrow-band color information from the non-homogeneity region (320). In 325, the calculator 125 divides the non-homogeneity region into 2×2 blocks that each include three pixels that have narrow-band color information and one pixel that has wide-band color information, and calculates correlation values between the three pieces of narrow-band color information and the one piece of wide-band color information included in each block.

In (330) the estimator 130 estimates wide-band color information of the selected pixel based on the narrow-band color information of the selected pixel, narrow-band color information of pixels that are adjacent to the selected pixel, and the correlation values between the acquired narrow-band color information and the acquired wide-band color information. The estimator 130 estimates wide-band color information of pixels that are not selected by the selector 120 in the non-homogeneity region, based on the wide-band color information that is acquired by the image acquiring unit 110 and the wide-band color information that is estimated by the estimator 130 (340). Accordingly, it is possible to estimate wide-band color information of all pixels in the non-homogeneity region.

In response to the image data being classified into a homogeneity region, the estimator 130 estimates wide-band color information of pixels that have narrow-band color information in the homogeneity region based on the acquired wide-band color information (350). Accordingly, it is also possible to estimate wide-band color information of all pixels in the homogeneity region.

The color image creator 150 may create color image data based on the image data including the estimated wide-band color information and the acquired wide-band color information (360).

As described in the example of FIG. 3, it is possible to estimate wide-band color information based on acquired narrow-band color information. In addition, the image processing method may restore a full resolution of an image or near full resolution of the image by restoring color image data using estimated wide-band color information.

FIGS. 4A through 4I illustrate examples of image processing.

Figure 4A:
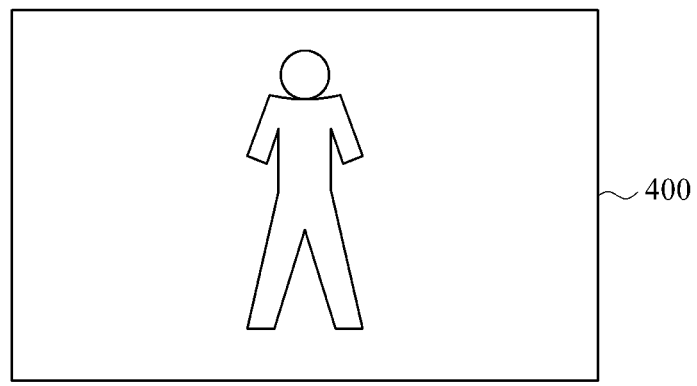
Figure 4B:
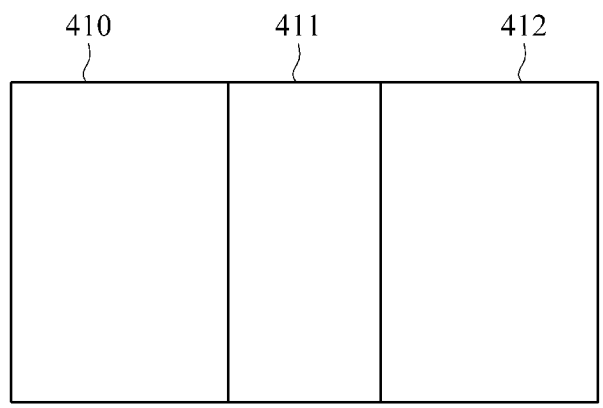

Referring to FIGS. 1 and 4A, the image acquiring unit 110 acquires image data that includes narrow-band color information and wide-band color information. Referring to FIG. 4B, the region classifying unit 115 classifies the image data into homogeneity regions 410 and 412 and a non-homogeneity region 411 using a Homogeneity theorem.

FIG. 4C is an example in which the homogeneity regions 410 and 412 and the non-homogeneity region 411 illustrated in FIG. 4B are represented as color information in units of pixels. Referring to FIG. 4C, in the homogeneity regions 410 and 412 and the non-homogeneity region 411, 2×2 blocks that each include R, G, B, and W are arranged successively. It should be appreciated that a total number of pixels is not limited to the example illustrated in FIG. 4C. The internal arrangement of each 2×2 block may be based on the configuration of a color filter that is included in the image acquiring unit 110. For example, if the color filter includes R, G, B, and W color filters, each 2×2 block may have an arrangement as illustrated in FIG. 4C. As another example, if the color filter includes C, M, Y, and W color filters, each 2×2 block may have an arrangement including C, M, Y, and W. In the example of FIG. 4C, $W_1$, $W_2$, $W_3$, and $W_4$ correspond to acquired wide-band color information.

Figure 4D:
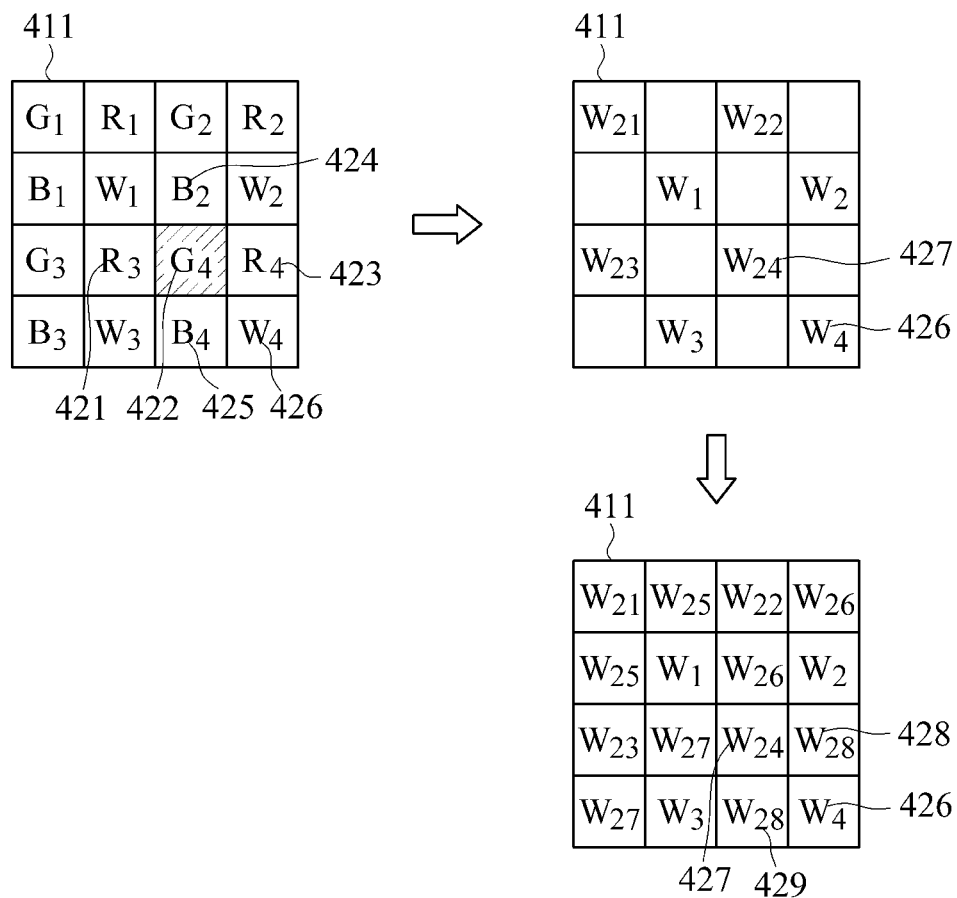

Referring to FIG. 4D illustrating the non-homogeneity region 411, the selector 120 may select at least one pixel that includes narrow-band color information from the non-homogeneity region 411. For example, the selector 120 may select pixels corresponding to $G_1$, $G_2$, $G_3$, and $G_4$. The calculator 125 may divide the non-homogeneity region 411 into 2×2 blocks that each include three pixels corresponding to narrow-band color information and one pixel corresponding to wide-band color information, and may calculate correlation values between the three pieces of narrow-band color information and the one piece of wide-band color information included in each block.

For example, the calculator 125 may calculate correlation values $C_r$, $C_g$, and $C_b$ based on the color information that is included in each block and Equation 1 below.

$$[W_1, W_2, \ldots, W_n] = [C_r, C_g, C_b] \times \begin{bmatrix} R_1 & G_1 & B_1 \\ R_2 & G_2 & B_2 \\ & \vdots & \\ R_n & G_n & B_n \end{bmatrix} \quad (1)$$

In Equation 1, W represents wide-band color information, R, G, and B represent narrow-band color information, and C represents correlation values. For example, if the color information is 8 bits, the wide-band color information and narrow-band color information may be represented by numbers between 0 and 255. Equation 1 is merely for purposes of example, and the correlation values $C_r$, $C_g$, and $C_b$ may be calculated using any other equations. For example, the correlation values may be calculated by assigning weights to the narrow-band color information.

The estimator 130 may estimate the wide-band color information of a pixel that is selected by the selector 120 in the non-homogeneity region. For example, the estimator 130 may estimate the wide-band color based on narrow-band color information of the selected pixel, narrow-band color information of pixels that are adjacent to the selected pixel, and/or correlation values between the acquired narrow-band color information and the acquired wide-band color information. For example, in the case in which a pixel $G_4$ (422) is selected, the estimator 130 may estimate wide-band color information $W_{24}$ (427) of the selected pixel $G_4$ using Equation 2 that is described below. The narrow-band color information of $R_3$, $R_4$, $B_2$, and $B_4$ (421, 423, 424, 425) correspond to pixels that are adjacent to the selected pixel $G_4$. That is, the narrow-band color information of $R_3$, $R_4$, $B_2$, and $B_4$ corresponds to the color information of 4 pixels that are located to the left, right, top, and bottom of the selected pixel $G_4$.

$$W_{24} = \frac{C_r G_4 + C_g \frac{R_3 + R_4}{2} + C_b \frac{B_2 + B_4}{2}}{3} \quad (2)$$

In Equation 2, $G_4$ is narrow-band color information of the selected pixel, $R_3$, $R_4$, $B_2$ and $B_4$ are narrow-band color information of the pixels that are adjacent to the selected pixel, and $C_r$, $C_g$, and $C_b$ are correlation values between the acquired narrow-band color information and the acquired wide-band color information.

For example, when $G_4$, $R_3$, $R_4$, $B_2$ and $B_4$ are all 10 and $C_r$, $C_g$, and $C_b$ are all 1, the broadband color information $W_{24}$ is calculated as 10.

The estimator 130 may estimate wide-band color information $W_{21}$, $W_{22}$, and $W_{23}$ of the other selected pixels $G_1$, $G_2$ and $G_3$ using the above-described process. However, Equation 2 is merely for purposes of example, and the wide-band color information may be estimated using any other equations. For example, the wide-band color information may be estimated by assigning a weight to each narrow-band color information obtained by Equation 2.

The estimator 130 may also estimate wide-band color information $W_{25}$ of a pixel that is not selected by the selector 120, based on the wide-band color information $W_1$ that is acquired by the image acquiring unit 110 and the wide-band color information $W_{21}$ estimated by the estimator 130. The estimator 130 may estimate wide-band color information $W_{26}$ of a pixel that is not selected by the selector 120, based on the wide-band color information $W_2$ that is acquired by the image acquiring unit 110 and the wide-band color information $W_{22}$ estimated by the estimator 130.

The estimator 130 may estimate wide-band color information $W_{27}$ of a pixel that is not selected by the selector 120, based on the wide-band color information $W_3$ that is acquired by the image acquiring unit 110 and the wide-band color information $W_{23}$ estimated by the estimator 130. For example, the estimator 130 may use various methods to estimate the wide-band color information of pixels that are not selected, such as Constant Hue-Based interpolation, Edge-Detected interpolation, Median-Based interpolation, Homogeneity base interpolation, and the like. Similarly, the estimator 130 may estimate wide-band color information $W_{28}$ (428) of a pixel that is not selected by the selector 120, based on the wide-band color information $W_4$ (426) that is acquired by the image acquiring unit 110 and the wide-band color information $W_{24}$ (427) estimated by the estimator 130. Accordingly, wide-band color information of all pixels in the non-homogeneity region 411 may be estimated.

Figure 4E:

FIG. 4E illustrates the homogeneity regions 410. In this example, the estimator 130 may estimate wide-band color information $W_{30}$, $W_{31}$, $W_{32}$, and $W_{33}$ of pixels corresponding to narrow-band color information in the homogeneity region 410, based on the acquired wide-band color information $W_5$, $W_6$, $W_7$, and $W_8$. Accordingly, wide-band color information for all of the pixels in the homogeneity regions 410 an 412 may be estimated. For example, the estimator 130 may estimate the wide-band color information $W_{30}$, $W_{31}$, $W_{32}$, and $W_{33}$ to be the same values as the acquired wide-band color information $W_5$, $W_6$, $W_7$, and $W_8$. As another example, the estimator 130 may estimate the wide-band color information $W_{30}$, $W_{31}$, $W_{32}$, and $W_{33}$ by assigning weights to the acquired wide-band color information $W_5$, $W_6$, $W_7$, and $W_8$.

Referring to FIGS. 4C and 4F, the estimator 130 may estimate wide-band color information $W_{35}$, $W_{36}$, $W_{37}$, and $W_{38}$ of pixels corresponding to narrow-band color information in the other homogeneity region 412, based on the acquired wide-band color information $W_9$, $W_{10}$, $W_{11}$, and $W_{12}$.

FIG. 4F is a view that illustrates acquired color information and wide-band color information that is estimated for the non-homogeneity region 411 and the homogeneity regions 410 and 412. Referring to FIG. 4F, the estimator 130 may estimate wide-band color information for the non-homogeneity region 411 and homogeneity regions 410 and 412. Accordingly, the image processing apparatus 100 may obtain wide-band color information that is estimated by the estimator 130 and wide-band color information $W_1$, $W_2$, $W_3$, $W_4$, $W_5$, $W_6$, $W_7$, $W_8$, $W_9$, $W_{10}$, $W_{11}$, and $W_{12}$ which is acquired by the image acquiring unit 110.

Figure 4G:
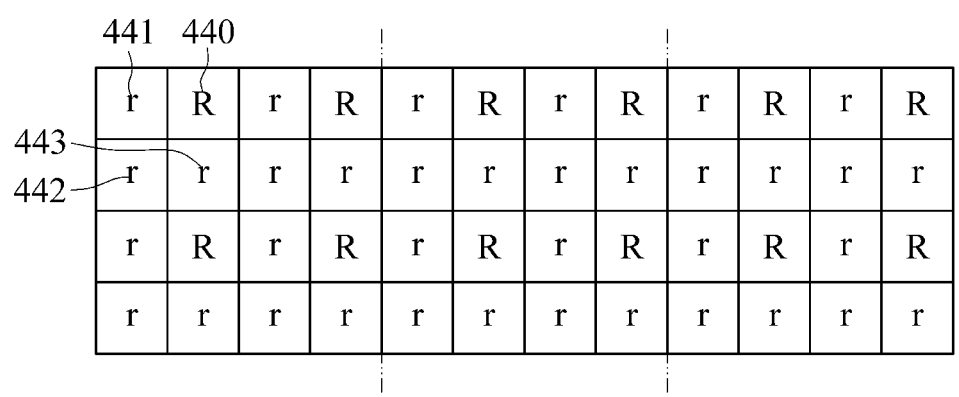

Referring to FIG. 4G, the color image creator 140 may estimate R color information based on the wide-band color information illustrated in FIG. 4F. For example, the color image creator 140 may estimate narrow-band color information 441, 442, and 443 based on acquired narrow-band color information 440 and the estimated wide-band color information $W_{30}$. For example, narrow-band color information corresponding to wide-band color information 20 may be 10 and narrow-band color information corresponding to wide-band color information 40 may be 20. For example, if the estimated wide-band color information $W_{30}$ is 40, the color image creator 140 may estimate the narrow-band color information 441, 442, and 443 to be 20.

In this example, the relative magnitudes of the narrow-band color information and the estimated wide-band color information may be set to various values by a user. The color image creator 140 may estimate narrow-band color information based on the relative magnitudes of the narrow-band color information and the estimated wide-band color information. By the process described herein, the color image creator 140 may estimate the remaining narrow-band color information.

Figure 4H:
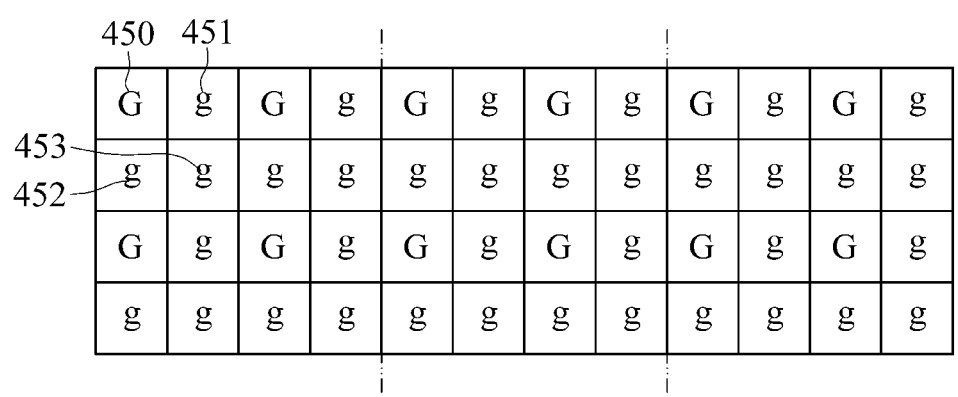

Referring to FIG. 4H, the color image creator 140 may estimate G color information based on the wide-band color information that is illustrated in FIG. 4F. For example, the color image creator 140 may estimate narrow-band color information 451, 452, and 453 based on acquired narrow-band color information 450 and the estimated wide-band color information $W_{30}$. For example, narrow-band color information corresponding to wide-band color information 20 may be 5 and narrow-band color information corresponding to wide-band color information 40 may be 10. For example, if the estimated wide-band color information $W_{30}$ is 40, the color image creator 140 may estimate narrow-band color information 451, 452, and 453 to be 10.

In this example, the relative magnitudes of the narrow-band color information and the wide-band color information may be set to various values by a user. The color image creator 140 may estimate narrow-band color information based on the relative magnitudes of the narrow-band color information and the estimated wide-band color information. By the process described herein, the color image creator 140 may estimate the remaining narrow-band color information.

Referring to FIG. 4I, the color image creator 140 may estimate B color information based on the wide-band color information illustrated in FIG. 4F. For example, the color image creator 140 may estimate narrow-band color information 461, 462, and 463 based on the acquired narrow-band color information 460 and the estimated wide-band color information $W_{30}$. For example, narrow-band color information corresponding to wide-band color information 20 may be 15 and narrow-band color information corresponding to wide-band color information 40 may be 25. For example, if the estimated wide-band color information $W_{30}$ is 40, the color image creator 140 may estimate narrow-band color information 461, 462, and 463 to be 25.

In this example, the relative magnitudes of the narrow-band color information and the estimated wide-band color information may be set to various values by a user. The color image creator 40 may estimate the narrow-band color information based on the relative magnitudes of the narrow-band color information and the estimated wide-band color information. By the process described herein, the color image creator 140 may estimate the remaining narrow-band color information.

The color image creator 140 may create a color image using the color information illustrated in FIGS. 4G, 4H and 4I.

As described herein, the image processing method and apparatus may estimate wide-band color information based on acquired narrow-band color information. Also, the image processing method and apparatus may restore a full resolution or near full resolution of an image by restoring color image data using estimated wide-band color information.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable labtop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image processing apparatus comprising:
   a selector configured to select at least one pixel from among pixels that correspond to narrow-band color information of image data that includes narrow-band color information and wide-band color information; and
   an estimator configured to estimate wide-band color information of the selected pixel, based on narrow-band color information of the selected pixel, narrow-band color information of pixels that are adjacent to the selected pixel, and correlation values between the narrow-band color information and the wide-band color information,
   wherein the narrow-band color information includes color information about light having a wavelength region corresponding to specific colors, and the wide-band color information includes color information about light having a wavelength region corresponding to several colors and a near Infrared wavelength region.

2. The image processing apparatus of claim 1, further comprising a region classifying unit configured to classify the image data into a homogeneity region and a non-homogeneity region using a Homogeneity theorem.

3. The image processing apparatus of claim 2, wherein the selector is configured to select at least one pixel from among pixels that correspond to the narrow-band color information in the non-homogeneity region.

4. The image processing apparatus of claim 1, wherein the estimator is further configured to estimate wide-band color information of a pixel that is not selected by the selector, based on the wide-band color information of the image data and the wide-band color information estimated by the estimator.

5. The image processing apparatus of claim 2, wherein the estimator is configured to estimate wide-band color information of pixels that correspond to the narrow-band color information in the homogeneity region, based on the wide-band color information of the image data in the homogeneity region.

6. The image processing apparatus of claim 1, wherein the narrow-band color information of pixels that are adjacent to the selected pixel is narrow-band color information of four pixels, and the four pixels include the pixels that are directly above, below, to the left, and to the right of the at least one selected pixel.

7. The image processing apparatus of claim 1, further comprising a calculator configured to divide the image data into 2×2 blocks that each include three pixels corresponding to the narrow-band color information and one pixel corresponding to the wide-band color information, and to calculate correlation values between the wide-band color information and the narrow-band color information included in each 2×2 block.

8. The image processing apparatus of claim 1, wherein the selector is configured to select at least one pixel from among pixels that correspond to the narrow-band color information, which are located diagonal to pixels corresponding to wide-band color information of the image data.

9. The image processing apparatus of claim 1, further comprising an image acquiring unit configured to acquire image data that includes narrow-band color information and wide-band color information that correspond to lights transmitted through a narrow-band color filter and a wide-band color filter, respectively, using photo sensors provided for individual pixels.

10. The image processing apparatus of claim 1, wherein the narrow-band color information is color information about light transmitted through at least one of a Red (R) color filter, a Green (G) color filter, a Blue (B) color filter, a Cyan (C) color filter, a Yellow (Y) color filter, a Magenta (M) color filter and a Black (K) color filter, and the wide-band color information is color information about light transmitted through at least one of a panchromatic filter and a White & Near Infrared (WNIR) filter.

11. An image processing method comprising:
selecting at least one pixel from among pixels that correspond to narrow-band color information of image data that includes the narrow-band color information and wide-band color information; and
estimating wide-band color information of the selected pixel based on narrow-band color information of the selected pixel, narrow-band color information of pixels that are adjacent to the selected pixels, and correlation values between the narrow-band color information and the wide-band color information,
wherein the narrow-band color information includes color information about light having a wavelength region corresponding specific colors, and the wide-band color information includes color information about light having a wavelength region corresponding to several colors and a near Infrared wavelength region.

12. The image processing method of claim 11, further comprising classifying the image data into a homogeneity region and a non-homogeneity region using a Homogeneity theorem.

13. The image processing method of claim 12, wherein the selecting of the at least one pixel comprises selecting at least one pixel from among pixels that correspond to the narrow-band color information in the non-homogeneity region.

14. The image processing method of claim 11, wherein the estimating of the wide-band color information further comprises estimating wide-band color information of a pixel that is not selected, based on the wide-band color information of the image data and the estimated wide-band color information.

15. The image processing method of claim 12, wherein the estimating of the wide-band color information comprises estimating wide-band color information of pixels that correspond to narrow-band color information in the homogeneity region, based on the wide-band color information of the image data in the homogeneity region.

16. The image processing method of claim 11, wherein the narrow-band color information of the pixels adjacent to the selected pixel is narrow-band color information of four pixels, and the four pixels include the pixels that are directly above, below, to the left, and to the right of the at least one selected pixel.

17. The image processing method of claim 11, further comprising dividing the image data into 2×2 blocks that each include three pixels corresponding to the narrow-band color information and one pixel corresponding to the wide-band color information, and calculating correlation values between the wide-band color information and the narrow-band color information included in each 2×2 block.

18. The image processing method of claim 11, wherein the selecting of the at least one pixel comprises selecting at least one pixel from among pixels that correspond to the narrow-band color information, which are located diagonal to pixels corresponding to the wide-band color information of the image data.

19. The image processing method of claim 11, further comprising acquiring image data that includes narrow-band color information and wide-band color information that corresponds to lights that are transmitted through a narrow-band color filter and a wide-band color filter, using photo sensors provided for individual pixels.

20. The image processing method of claim 11, wherein the narrow-band color information is color information about light transmitted through at least one of a Red (R) color filter, a Green (G) color filter, a Blue (B) color filter, a Cyan (C) color filter, a Yellow (Y) color filter, a Magenta (M) color filter and a Black (K) color filter, and the wide-band color information is color information about light transmitted through at least one of a panchromatic filter and a White & Near Infrared (WNIR) filter.

* * * * *